United States Patent [19]

Ohya et al.

[11] Patent Number: 4,565,121
[45] Date of Patent: Jan. 21, 1986

[54] APPARATUS FOR USE IN PREPARING INFUSIONS

[75] Inventors: Yoshio Ohya; Junichi Sano, both of Kamo; Koichi Tamaki, Niigata, all of Japan

[73] Assignee: Toshiba Heating Appliances Co., Ltd., Niigata, Japan

[21] Appl. No.: 674,753

[22] Filed: Nov. 26, 1984

[30] Foreign Application Priority Data

| Nov. 29, 1983 | [JP] | Japan | 58-224778 |
| Dec. 29, 1983 | [JP] | Japan | 58-248186[U] |
| Jan. 9, 1984 | [JP] | Japan | 59-1212[U] |
| Feb. 17, 1984 | [JP] | Japan | 59-22218[U] |
| Jun. 20, 1984 | [JP] | Japan | 59-92787[U] |
| Jun. 20, 1984 | [JP] | Japan | 59-92788[U] |
| Oct. 12, 1984 | [JP] | Japan | 59-214645 |

[51] Int. Cl.$^4$ .................................... H47J 31/00
[52] U.S. Cl. ............................ 99/281; 99/293; 219/297; 219/327
[58] Field of Search ............... 99/281, 280, 282, 283, 99/290, 293, 299, 300, 302 R, 304, 316; 219/297, 332, 333, 327, 335; 426/433

[56] References Cited

U.S. PATENT DOCUMENTS

| 3,085,880 | 4/1963 | Matty | 99/283 |
| 3,505,947 | 4/1970 | Bresaola | 99/283 |
| 3,599,557 | 8/1971 | Leal | 99/302 R |
| 4,102,255 | 7/1978 | Gasparrini | 99/303 |
| 4,287,817 | 9/1981 | Moskowitz | 99/282 |

Primary Examiner—Robert W. Jenkins
Attorney, Agent, or Firm—Flehr, Hohbach, Test, Albritton & Herbert

[57] ABSTRACT

An apparatus for preparing infusions such as coffee in different forms includes a sealed container in which water is heated so that it can be used either as hot water or steam, a water tank and a heating element for heating the contents of the container. Water in the tank can flow into the container through a conduit containing a check valve. Four conduits have outlets at the top of the container. One of them is connected to an infuser and is adapted to transport hot water. Another conduit is adapted to transport steam which may be used for preparing a cappuccino-like drink or for preheating a receptacle. The other two conduits are for removing high pressure steam from inside the container, one of them having an outlet near the bottom of a subtank which is built as a part of the water tank.

10 Claims, 8 Drawing Figures

APPARATUS FOR USE IN PREPARING INFUSIONS

BACKGROUND OF THE INVENTION

1. Field of the Invention

This invention relates to an apparatus for use in preparing infusions and in particular to a single-unit portable apparatus which is intended primarily for use in preparing coffee in different forms. It should be realized, however, that an apparatus as set forth herein can also be utilized for preparing other drinks such as tea and chocolate.

2. Description of the Prior Art

In the past, widely different types of coffee making apparatus have been developed and used. The most common, or "normal" form of coffee is prepared by placing roasted ground coffee beans inside a brewing basket or infuser and using water at a temperature slightly below the boiling point. These various types for use in preparing "normal" coffee include drip coffee makers, syphone-type infusers and pot-type brews, and they are disclosed, for example, in U.S. Pat. Nos. 4,413,552, 4,083,295, 4,361,750, 4,402,257, 2,567,027, 4,382,402, 4,356,382 and 4,287,817.

These are people, however, who may prefer "espresso" coffee which is prepared by placing roasted ground coffee beans in a similar infuser or a brewing basket and processing them with steam or water at a temperature somewhat above the boiling point. Various types of "espresso" coffee makers are disclosed, for example, in U.S. Pat. Nos. 4,102,255, 3,505,947, 4,137,833 and 3,599,557.

There are still others who may prefer "cappuccino" coffee which is prepared by mixing espresso type coffee with milk or a similar product and injecting steam into the mixture.

In the past, it was generally necessary to use different coffee making apparatus for preparing "normal" coffee and espresso and this had the effect of making it difficult for many homes and restaurants to be able to serve the both kinds of coffee because homes and restaurants frequently do not have the space for two types of coffee makers or sometimes because of economic reasons.

As for portable coffee makers, it has become popular to make a whole pot of coffee at homes and offices as in restaurants. There are difficulties both in terms of convenience and economy in making only one cup of coffee at a time and the quantity to be infused cannot be controlled because most of the boiling water in a sealed container is extracted nearly instantly due to its internal pressure. This makes it necessary to first extract liquid coffee into a receptacle and then to transfer the liquid coffee into the coffee cup.

In view of such inconvenience, there has been a need for a new improved apparatus for preparing different types of infusions such as coffee in different forms.

SUMMARY OF THE INVENTION

It is an object of this invention to provide a new and improved apparatus for preparing different types of infusions such as coffee in different forms.

It is another object of this invention to provide an apparatus for preparing infusions by which the quantity of infusions can be controlled by heating only an appropriate amount of water for infusing.

It is a further object of this invention to provide an apparatus for preparing infusions which can keep water in an enclosed container at an appropriately hot temperature slightly below the boiling point after infusion.

According to this invention, the above and other objectives are achieved by providing an apparatus comprising a water tank adapted to hold water, a sealed container, a heating means for heating the container by an electric heating element, a first conduit means connecting the container and the water tank, an infuser means having an inlet and an outlet, a second conduit means connecting the sealed container and the inlet of the infuser, a third conduit means for transporting steam through the top of the container to the water tank, a fourth conduit means for removing steam through the top of the container to the water tank, a first valve means for controlling the movement of hot water through the second conduit means, a second valve means for controlling the movement of steam through the third conduit means, a first control switch connected in series with the electric heating element and the abovementioned values, a third (air vent) valve means for controlling the removal of steam from the container through the fourth conduit means, a second control switch connected in series with the first control switch and the air vent valve means, and a thermostat connected in parallel with the second switch.

Figure 1:
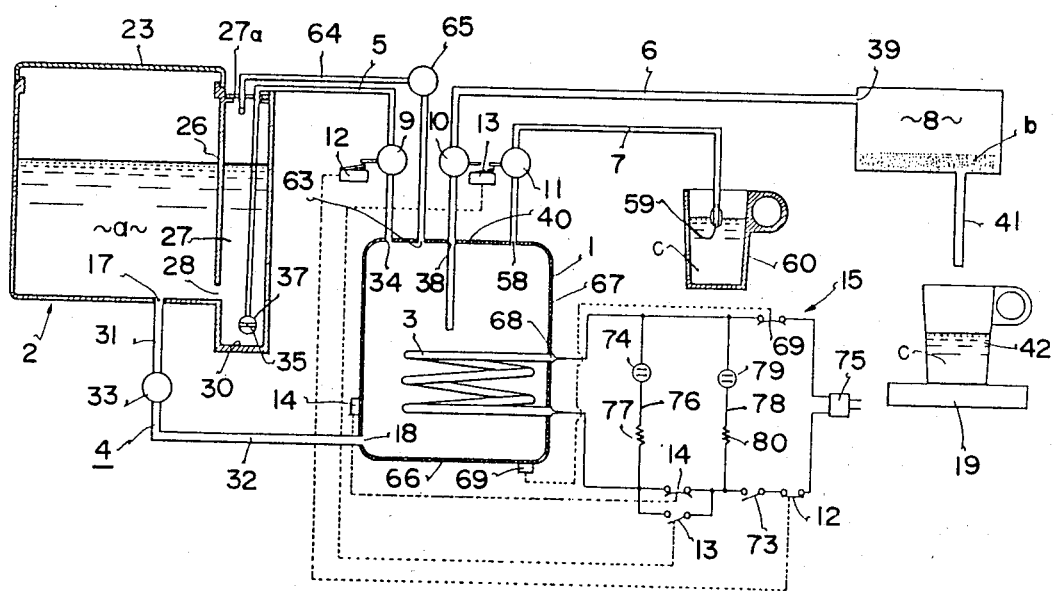
FIG. 1 is a structural diagram of an apparatus embodying the present invention.
Figure 2:
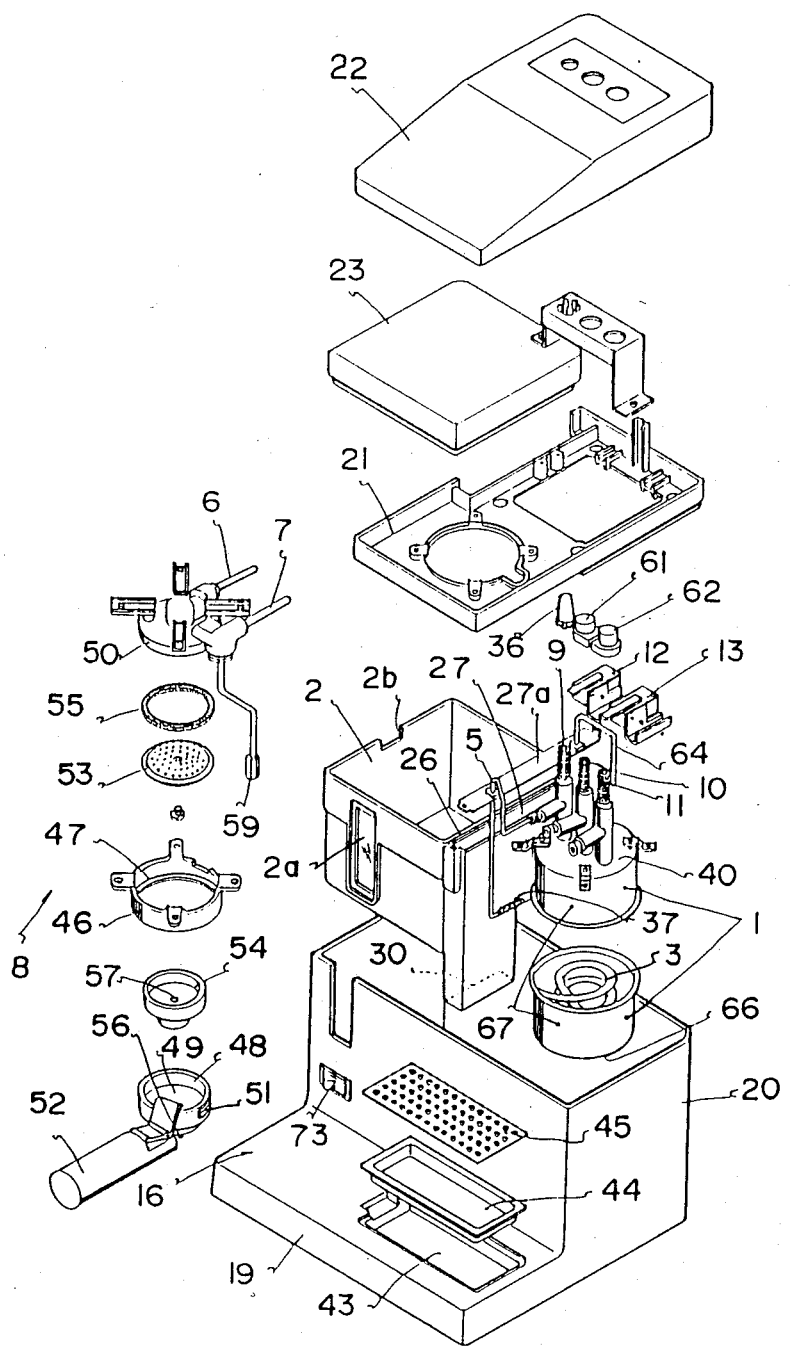
FIG. 2 is an exploded view of an apparatus of this invention.
Figure 3:
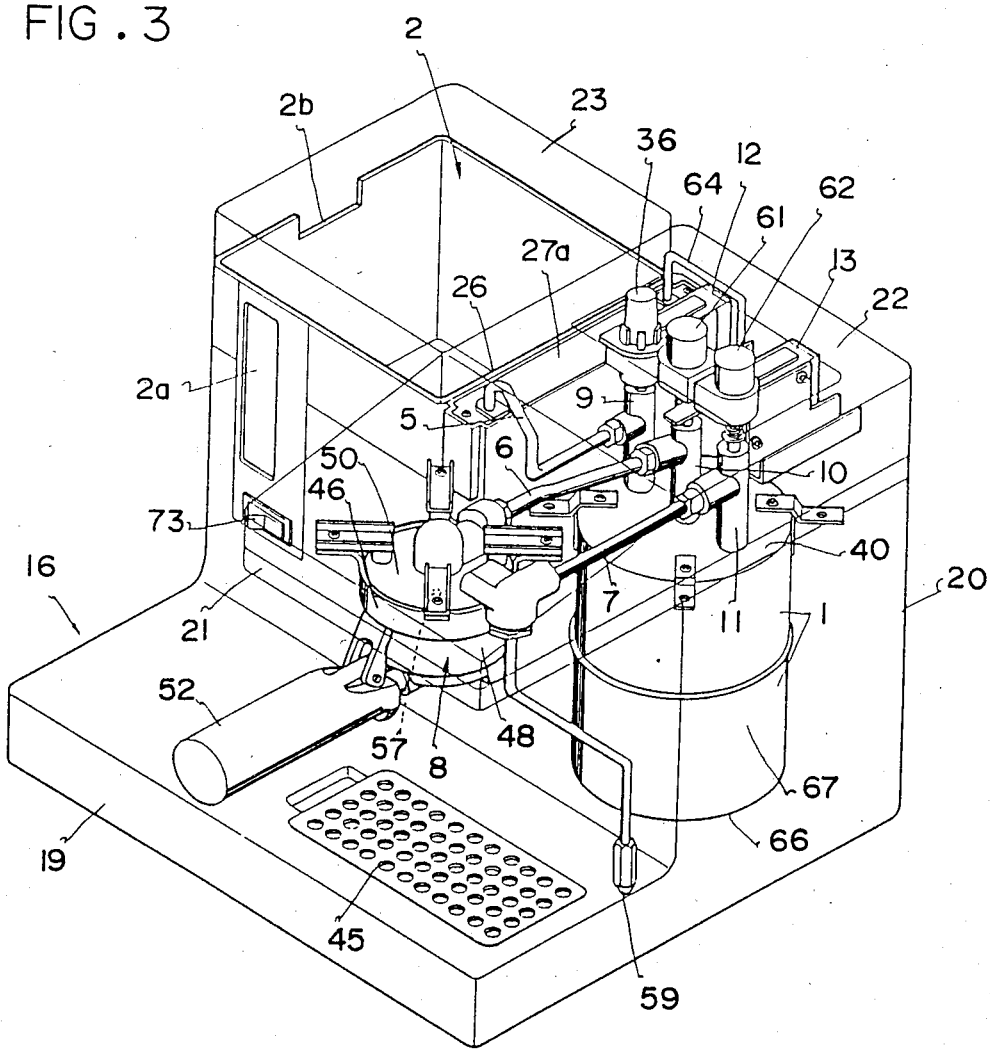
FIG. 3 is a perspective view of the interior of an apparatus of this invention.
Figure 4:
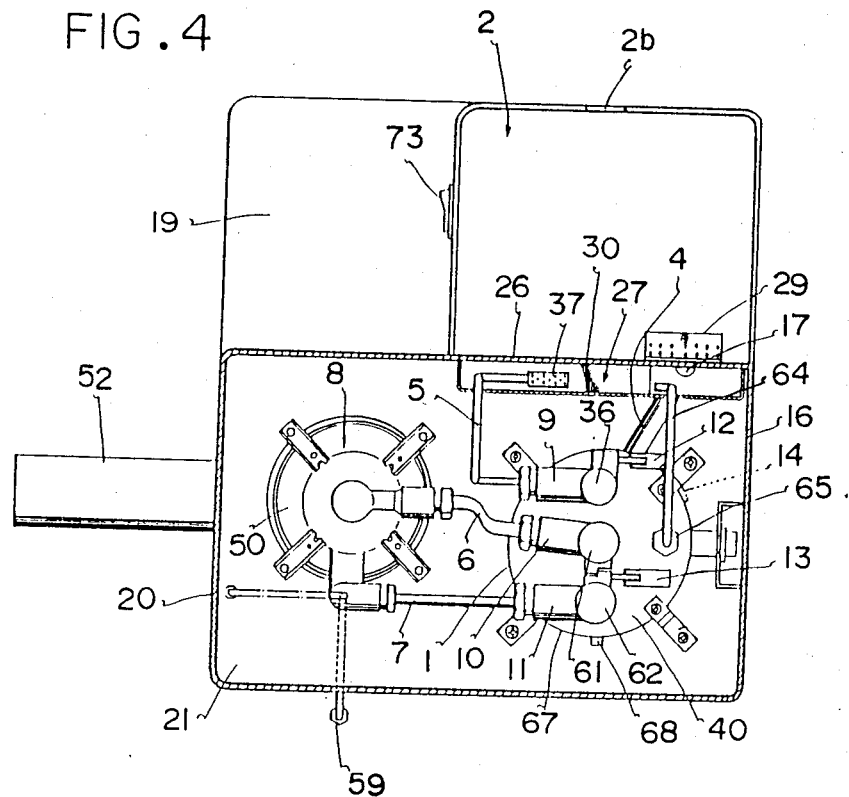
FIG. 4 is a fragmentary top view of the apparatus of FIG. 3.
Figure 5:
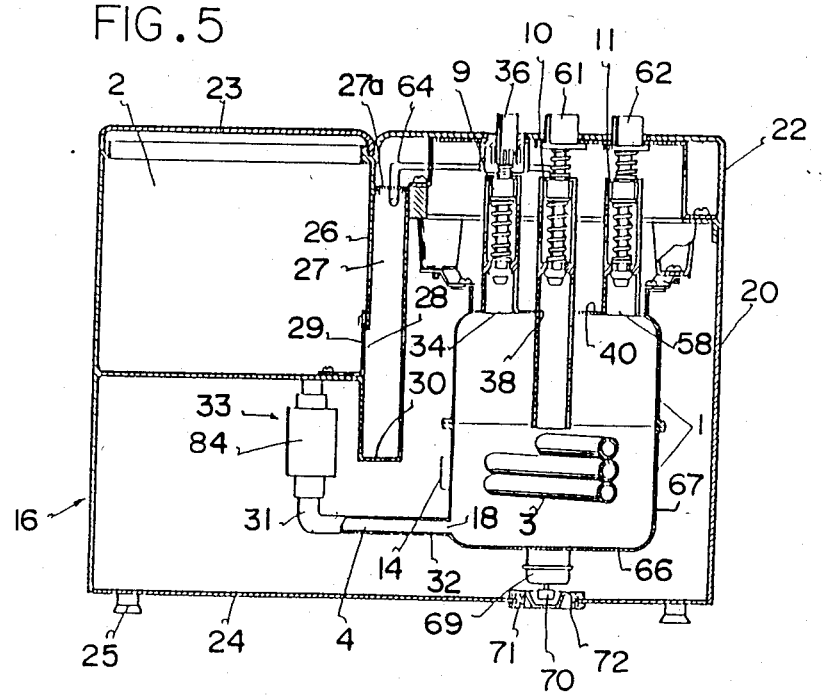
FIG. 5 is a longitudinal sectional view of the apparatus of FIG. 3. p

The apparatus according to this invention illustrated in these drawings is connected in accordance with certain concepts and principles expressed in the appended claims. The same concepts and principles can be used in a variety of other apparatus for use in preparing other types of infusions. It is therefore to be understood that the present invention is not limited in scope by the example illustrated in the drawings.

DESCRIPTION OF THE PREFERRED EMBODIMENT

The appended drawings show an apparatus for use in preparing infusions which comprises an enclosed sealed container 1, a water tank 2, a heating element 3, for conduits 4, 5, 6 and 7, an infuser 8, three adjustable valves 9, 10 and 11, an electric circuit 15 including two control switches 12 and 13 and a thermostat 14, and a casing 16 with the water tank 2 positioned to its left-hand side and the sealed container 1 to its right-hand side.

The water tank 2 is positioned slightly above the container 1. Water which is stored inside the tank 2 is syphoned into the container 1 from an inlet 18 at the bottom of the container 1 through the conduit 4 connected to an outlet 17 at the bottom of the tank 2.

The casing 16 may be made of a plastic material and comprises a flat, rectangular base 19, a rectangular housing 20 which is disposed on the back side of the base 19 and open on the top and bottom sides, having a forwardly protruding section 21 for fastening the infuser 8, a cover 22 for the protruding section 21, another cover 23 for the water tank 2, a bottom plate 24 for covering the bottom side of the base 19 and legs 25 affixed to the bottom plate 24.

The water tank 2 is provided with a subtank 27 separated by a partition plate 26. The partition plate has an opening 28 near the bottom so that the same water level will be maintained in the water tank 2 and the subtank 27. A filter is provided for the opening 28.

The subtank 27 has a recessed bottom 30 and this make it deeper than the water tank 2. The subtank 27 is open above and is covered with a lid 27a. The outlet 17 into the conduit 4 is at the bottom of the tank 2 near the opening 28. There is a peephole 2a on the front wall of the tank 2 so that the water level inside can be observed. The tank 2 is also provided with an indented section 2b at an upper edge to make it easier to pour water in.

The conduit 4 comprises a vertical portion 31 which is connected to the outlet 17 and a horizontal portion 32 which connects the container 1 with the bottom end of the vertical portion 31. A conventional type of check valve 33 is mounted in the vertical portion 31 so as to allow water to flow downward from the outlet 17 through the conduit 4 to the inlet 18 of the container 1, while preventing water to flow back upward to the outlet 17.

There is an outlet 34 at the top of the container 1, leading to the conduit 5 in which is installed a conventional air vent valve 9. The conduit 5 leads to the subtank 27 and is provided with an exhaust port 35 at its end where it is connected to a sound arrester 37. The air vent valve 9 is normally closed and its function is to remove steam from the container 1 after infusion. It has a conventional push button-locking mechanism with a push button 36. There is connected with the push button 36 of the air vent valve 9 a normally closed switch 12.

Another outlet 38 at the top 40 of the container 1 opens into the conduit 6 which contains a conventional valve 10 and leads to the infuser 8 through an inlet 39. The infuser 8 may be constructed in a variety of ways. An outlet 41 from the infuser 8 extends for discharging the infusion prepared inside the infuser 8 into an appropriate receptacle 42 such as a cup or a carafe. The infuser 8 should be sufficiently high with respect to the container 1 so that water will not move directly into the infuser 8 when the container 1 is being filled. Furthermore, the outlet 41 should be sufficiently above the receptacle 42 so that the brewed liquid c will not be syphoned back into the infuser 8, etc. The part of the base 19 below the outlet 41 is provided with a space for placing the cup 42. The base 19 has a recess 43 in which a dish-shaped receptacle 44 is fitted and a perforated metal plate 45 is detachably fitted over the receptacle 44.

The infuser comprises a circular frame 46 opening in upward and downward directions and a generally broad annular chamber body 48 which defines a passageway 49 extending vertically therethrough. The exterior circular rim portion of the mouth of the chamber body 48 is provided with circumferentially arranged twist lock connector means 51 for detachably connecting with the twist lock connector means 47 of the lid portion 50. A cylindrical handle 52 preferably made of a hard plastic material or other thermally insulative material is detachably attached to the chamber body 48 by a lever. In assembling the infuser 8, the chamber body 48 is inserted from the lower opening of the circular frame 46 by holding the handle 52. It is raised until its upper opening comes to be covered by the lid portion 50 and rotated by an appropriate angle until the connector means 51 and 47 will engage together. Then the chamber body 48 hangs from the frame 46 and its upper part directly comes into contact with a rubber O-ring 55 to form an airtight seal. A funnel element 54 is fitted in the lower interior of the chamber body 48 and directly below the filter disk 53. A spout means 56 below the chamber body 48 is fitted to the top opening 57 of the funnel means 54 through the passage.

Still another outlet 58 at the top of the container 1 leads to the conduit 7 which contains another conventional valve 11 which is normally closed and connects to an exhaust port 59. The exhaust port 59 extends for discharging steam into the infusion into a cup-like utensil 60. Another switch 13 is selectively connected with the valves 10 and 11 which are respectively operated with push buttons 61 and 62. A further outlet 63 at the top of the container 1 opens to a conduit 64 which contains a safety valve 65 and leads to the upper part of the subtank 27. The operation of the safety valve is well known and needs no explanation.

In using this apparatus, the heating element 3 of a conventional electrical type near the bottom 66 of the container 1 is first activated. The heating element 3 is connected at it ends 68 through the side wall 67 of the container 1 to the electric circuit 15. The air above water inside the container 1 is heated and expands in volume. This air which contains water vapor moves around and partially flows into the subtank 27 by opening the safety valve 65. A thermostat 14 is preferably mounted immediately on the container 1 and adjacent to the heating element 15 and set to open at a temperature above 90° C. and to close at a temperature below 80° C. Another thermostat 69 which is set to open at temperatures above 110° C. is affixed to the bottom 66 of the container 1. This thermostat 69 is of the manual reset type and includes a reset button 70 which extends into a rubber recess 71 and can be pressed from outside through an opening 72 ini the bottom plate 24.

A master on/off switch 73 is mounted on the housing 20 and is connected with the electric circuit 15 which includes a display lamp 74. The electric circuit 15 also includes a conventional AC power source 75 connected in series with the master switch 73 and the switch 12. The thermostat 14 is connected in parallel with the switch 13 and the heating element 3 is connected in series with a line 76 connected in parallel with the display lamp 74 and a resistor 77. Another line 78 is connected in series with a lamp 79 and resistor 80 and in parallel with the heating element 3 and the thermostat 14.

The method of operating the apparatus is rather simple. When "normal" coffee is desired, roasted ground coffee beans are placed in the infuser 8. This may be done by removing the chamber body 48 off the casing 16, placing the coffee beans on the filter disk 53 and attaching the chamber body 48 to the frame 46 by means of the handle 52. The lid 23 is next removed from the container 1. In order to transport water into the container 1, the control valve 11 is opened by means of the push button 62 and this causes the air inside the container 1 to be removed through the conduit 7 and the exhaust port 59. In the meantime, water in the tank 2 moves into the container 1 through the check valve 33 and the conduit 4.

When the master switch 73 is closed, lamps 74 and 79 are turned on and power is supplied to the heating element 3, thereby raising the temperature of water a inside the container 1. This is shown by $A_1$ in FIG. 8. When the water temperature reaches 90° C., the thermostat 14 is activated and the lamp 74 goes off, shutting off the power supply to the heating element 3. The temperature of water inside the container 1 is thereafter maintained in the range between 80° and 90° C. by the action of the thermostat 14. This state is shown by $B_1$ in FIG. 8.

Figure 8:
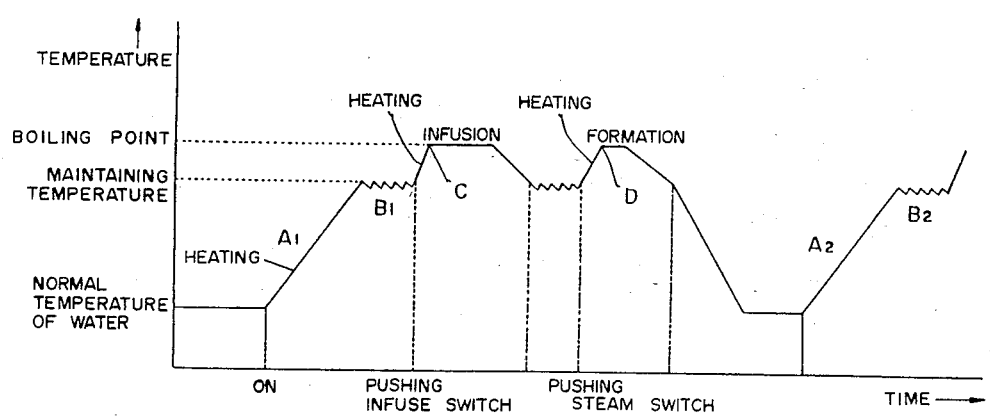
FIG. 8 is a graph showing the temperature in the container as a function of time.

If the push button 61 is pressed next, the switch 13 becomes closed and power is supplied to the heating element 3, raising the temperature of the water still further and eventually causing it to boil as shown by C in FIG. 8. The hot water inside the container 1 will then be forced through the outlet 38 and the valve 10 to the infuser 8 containing ground coffee b. Coffee drink thus prepared will flow into the receptacle 42 through the outlet 41. When it is desired to stop the flow into the receptacle 42, the push button 61 is operated again to open the switch 13.

When the apparatus is used for preparing cappuccino, no grouns coffee is required inside the infuser 8. Milk is added to the coffee c inside the cup 60. The end 59 of the conduit 7 is put inside as shown in FIG. 1 and the push button 62 is pressed to open the valve 11. At the same time, switch 13 is closed and power becomes supplied to the heating element 3. Thus, if the push button 62 is kept pressed, the remaining water inside will become hotter and eventually reach the boiling point as shown by D in FIG. 8. The high pressure steam generated inside the sealed container 1 will then pass through the conduit 7 and escape into the cup 60. After the foaming, the valve 11 is closed and the switch 13 is opened. The cup 42 may also be preheated with the steam before the coffee is poured so that the drink will not cool quickly.

When more coffee drink is desired, the push button 36 should be pressed to lock the air vent valve 9 open. The pressure inside the sealed container 1 will decrease, pushing the air into the subtank 27 through the conduit 5. There is a sound arrester 37 provided at the end of the conduit 5 so that the exhaust air can quietly move into the water inside the subtank 27. This, together with the difference in water level, causes water to flow from the tank 2 into the container 1. When the push button 36 is pressed again, the lock is released and the valve 9 is closed. The switch 12 also becomes closed and power is supplied to the heating element 3. Water temperature rises again as shown by $A_2$ in FIG. 8 and is maintained in the range between 80° and 90° C. by the operation of the thermostat 14 ($B_2$ of FIG. 8). Lamp 74 goes on only when power is being supplied while water is kept warm in the aforementioned range. The chamber body 48 may now be removed from the frame 46.

Figure 6:
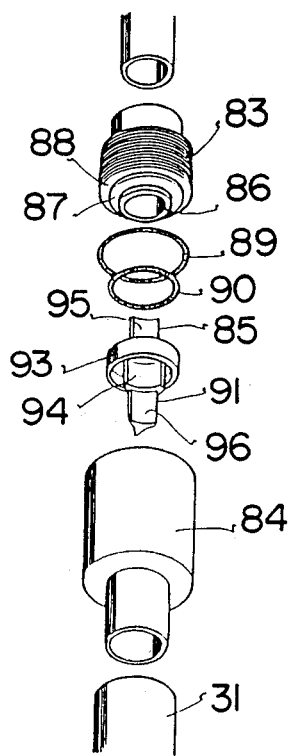
FIG. 6 is an exploded view of the check valve in the apparatus of FIG. 3.
Figure 7:
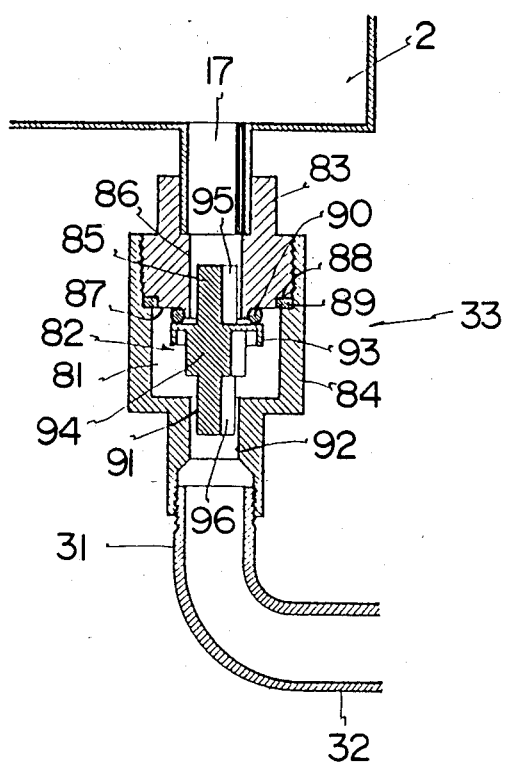
FIG. 7 is a longitudinal sectional view of the check valve of FIG. 6.

The check valve 33 is adapted to allow water to flow downward through it but not upward from the inlet 18. It comprises as shown in FIGS. 6 and 7 a housing assembly 81 and a central element 82. The housing assembly consists essentially of a pair of cylindrical valve holders 83 and 84 which are screwed together, while the central element 82 is disposed inside the housing assembly 81 and is made of a thermostable material which is somewhat heavier than water (with specific weight preferably in the range between 1.05 and 1.15).

The upper valve holder 83 includes a tubular member 87 defining an opening 86. A conventional type of sealing O-ring 89 is fitted into a depression 88 provided on the holder 83, forming a water-tight connection with the lower valve holder 84 which defines therethrough an opening 92 in its lower portion. Another O-ring 90 is placed against the bottom surface of the tubular member 87.

The central element 82 has an annular member 93 connected to upper and lower sliding pieces 85 and 91 which are adapted to slide vertically inside the openings 86 and 92, respectively, so as to allow the central element 82 to move up and down according to the direction of the water flow inside. The upper portion 94 of the lower sliding piece 91 is made thicker for preventing backflow as will be explained below.

The sliding pieces 85 and 91 are provided with grooved surfaces 95 and 96, respectively, so that water can flow through the openings 86 and 92. The thicker upper portion 94 of the lower sliding piece 91 is so designed that it will be pressed against the upper rims of the opening 92 when water is flowing downward. When the pressure inside the container 1 is increased, the central element 82 is pushed upward against the O-ring 89 and prevents the backflow of water into the tank 2.

The safety features of the apparatus include the second thermostat 69 which is adapted to operate to shut off the power supply to the heating element 3 if abnormal heating is detected inside the sealed container 1 due, for example, to a malfunction of the thermostat 14. The thermostat 69 is so designed that it will not automatically allow the resumption of heating even after the container temperature drops to a normal level.

There is also a safety valve 65 which would open if the thermostat 69, too, failed to operate normally and the pressure inside the sealed container 1 reached an abnormally high level. This would cause the high-pressure steam to escape into the subtank 27 through the conduit 64, preventing the steam from being discharged directly to outside.

What is claimed is:

1. An apparatus for use in preparing infusions, said apparatus comprising
   a water tank,
   a sealed container having a top,
   a heating means including a heating element inside said sealed container,
   a first conduit means connecting said sealed container and said water tank,
   an infuser means having an inlet and an outlet,
   a second conduit means connecting said container and said inlet,
   a third conduit means for conveying steam from said container through said top,
   a first valve means for controlling the movement of liquid through said second conduit means,
   a second valve means for controlling the movement of liquid through said third conduit means,
   a first control switch connected in series with said heating element, said first control switch being adapted to operate said first and second valves,
   an air vent valve for controlling the removal of steam from said container through a fourth conduit means, a second control switch connected in series with said first control switch and with said air vent valve, and a thermostat adapted to control the temperature inside said container, said thermostat being connected in parallel with said second conotrol switch.

2. The apparatus of claim 1 further comprising a subtank which is separated from said water tank by a partition, said partition having an opening near the bottom so that the water level in said subtank can be maintained the same as that in said water tank, the bottom of said subtank having a recess, said recess being deeper than the bottom of said water tank.

3. The apparatus of claim 2 further comprising a fifth conduit means which contains a safety valve and connects said subtank with said container through said top.

4. The apparatus of claim 1 wherein said fourth conduit means has an end which is positioned near the bottom of said subtank.

5. The apparatus of claim 1 further comprising a check valve, said first conduit means having a vertical portion, said check valve being disposed in said vertical portion, said check valve being adapted to allow water to flow downward therethrough from said water tank to said container but to prevent water to move upward therethrough from said container to said water tank.

6. The apparatus of claim 5 wherein said check valve comprises a valve housing,
a moving piece disposed inside said valve housing,
a valve inlet connected to said water tank, and
a valve outlet connected to said container, said check valve being so oriented that said valve inlet is above said valve outlet.

7. The apparatus of claim 8 wherein said moving piece is made of a thermostable material of specific gravity in the range of 1.05 to 1.15.

8. The apparatus of claim 1 wherein said first control switch consists of one switch.

9. The apparatus of claim 1 wherein said container is positioned lower than said water tank.

10. The apparatus of claim 1 wherein said first, second and air vent valves are operated manually.

* * * * *